United States Patent
Yamashita et al.

(10) Patent No.: US 11,741,833 B2
(45) Date of Patent: Aug. 29, 2023

(54) VEHICLE DRIVING ASSIST APPARATUS

(71) Applicant: TOYOTA JIDOSHA KABUSHIKI KAISHA, Toyota (JP)

(72) Inventors: Masahiro Yamashita, Toyota (JP); Yosuke Wada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/833,282

(22) Filed: Jun. 6, 2022

(65) Prior Publication Data
US 2023/0030093 A1 Feb. 2, 2023

(30) Foreign Application Priority Data

Jul. 30, 2021 (JP) ................................. 2021-125729

(51) Int. Cl.
*G08G 1/0962* (2006.01)
*B60K 35/00* (2006.01)

(52) U.S. Cl.
CPC .......... *G08G 1/09623* (2013.01); *B60K 35/00* (2013.01); *B60K 2370/168* (2019.05)

(58) Field of Classification Search
CPC .......... G08G 1/09623; B60K 2370/168; B60K 35/00
See application file for complete search history.

(56) References Cited

U.S. PATENT DOCUMENTS

| | | | |
|---|---|---|---|
| 6,472,977 B1 | 10/2002 | Pöchmüller | |
| 2004/0075582 A1* | 4/2004 | Bergan | G08G 1/01 340/936 |
| 2009/0140882 A1* | 6/2009 | Arenburg | G08G 1/096741 340/936 |
| 2011/0288770 A1* | 11/2011 | Greasby | G01C 21/3697 701/532 |

(Continued)

FOREIGN PATENT DOCUMENTS

| | | |
|---|---|---|
| EP | 2529993 A1 | 12/2012 |
| JP | 2017-045194 A | 3/2017 |
| JP | 2017-062696 A | 3/2017 |

OTHER PUBLICATIONS

Extended European Search Report dated Nov. 28, 2022 in Application No. 22180004.8.

*Primary Examiner* — Chico A Foxx
(74) *Attorney, Agent, or Firm* — Sughrue Mion, PLLC

(57) ABSTRACT

When vehicle forward information includes information on a construction site road sign which indicates the limit speed at a construction site, a vehicle driving assist apparatus acquires the limit speed indicated on the construction site road sign as a construction site sign limit speed, based on the vehicle forward information and displays the acquired construction site sign limit speed on the displaying device. When acquiring the database limit speed while displaying the construction site sign limit speed on the displaying device, and a distance that an own vehicle has moved since acquiring the construction site sign speed limit currently (Continued)

displayed on the displaying device is shorter than a predetermined distance, the vehicle driving assist apparatus continues displaying the construction site sign limit speed on the displaying device without displaying the database limit speed acquired this time on the displaying device.

8 Claims, 10 Drawing Sheets

(56) References Cited

U.S. PATENT DOCUMENTS

| | | | |
|---|---|---|---|
| 2015/0035981 A1 | 2/2015 | Otsuki et al. | |
| 2016/0350606 A1* | 12/2016 | Yoshitomi | G06V 20/588 |
| 2017/0092125 A1 | 3/2017 | Fujimaki | |
| 2017/0127237 A1* | 5/2017 | Hayee | G01S 19/51 |
| 2017/0144545 A1* | 5/2017 | Yanatsubo | G06V 20/582 |
| 2018/0247532 A1 | 8/2018 | Koyama et al. | |
| 2021/0049901 A1* | 2/2021 | Young | H04W 4/46 |
| 2021/0122388 A1* | 4/2021 | Qiu | B60W 40/10 |
| 2021/0383687 A1* | 12/2021 | Stenneth | G08G 1/0116 |

* cited by examiner

VEHICLE DRIVING ASSIST APPARATUS

CROSS-REFERENCE TO RELATED APPLICATIONS

This application claims priority to Japanese patent application No. JP 2021-125729 filed on Jul. 30, 2021, the content of which is hereby incorporated by reference in its entirety.

BACKGROUND

Field

The invention relates to a vehicle driving assist apparatus.

Description of the Related Art

There is known a vehicle driving assist apparatus which displays a limit speed to be applied to an own vehicle on a displaying device such as a display provided in the own vehicle. Also, there is known a vehicle driving assist apparatus which recognizes a road sign, based on image information acquired by a camera, acquires the limit speed indicated on the recognized road sign, acquires the limit speed from a database, selects a suitable limit speed from the acquired limit speeds, and displays the selected limit speed on the displaying device (for example, see JP 2017-45194 A).

A road sign indicating the limit speed other than the general limit speed may be provided at a road having a construction site. If the limit speed acquired from the database or the general road sign is displayed on the displaying device when the own vehicle moves at the construction site, the displayed limit speed may be different from the limit speed to be applied to the own vehicle moving at the construction site.

SUMMARY

An object of the invention is to provide a vehicle driving assist apparatus which displays a suitable limit speed on the displaying device as a limit speed to be applied to the own vehicle.

A vehicle driving assist apparatus according to the invention comprises a vehicle forward information acquiring apparatus and an electronic control unit. The vehicle forward information acquiring apparatus takes images of a view ahead of an own vehicle and acquires information on a situation ahead of the own vehicle as vehicle forward information, based on information of the taken images. The electronic control unit controls displaying a limit speed to be applied to the own vehicle on a displaying device.

The electronic control unit is configured to acquire the limit speed indicated on a road sign as a road sign limit speed, based on the vehicle forward information and acquire the limit speed to be currently applied to the own vehicle as a database limit speed from a database which memorizes the limit speeds.

Further, when the vehicle forward information includes information on a construction site road sign which indicates the limit speed at a construction site, the electronic control is configured to acquire the limit speed indicated on the construction site road sign as a construction site sign limit speed, based on the vehicle forward information and display the construction site sign limit speed acquired this time on the displaying device.

Furthermore, when (i) the electronic control unit acquires the database limit speed while the electronic control unit displays the construction site sign limit speed on the displaying device, and (ii) a distance that the own vehicle has moved since the electronic control unit acquires the construction site sign speed limit currently displayed on the displaying device is shorter than a predetermined displaying change permission distance, the electronic control unit is configured to continue displaying the construction site sign limit speed on the displaying device without displaying the database limit speed acquired this time on the displaying device.

When the database limit speed is acquired before the own vehicle has moved a certain distance since the construction site sign limit speed is acquired, the limit speed to be applied to the own vehicle is probably the construction site sign limit speed. Under the circumstances, if the acquired database limit speed is displayed on the displaying device, the limit speed currently displayed on the displaying device may be wrong.

With the invention, when the database limit speed is acquired while the construction site sign limit speed is displayed on the displaying device, the construction site sign limit speed continues being displayed on the displaying device until the own vehicle moves a certain distance, i.e., the predetermined displaying change permission distance since the construction site sign limit speed currently displayed on the displaying device is acquired. Thus, a suitable limit speed can be displayed on the displaying device as the limit speed to be applied to the own vehicle.

According to an aspect of the invention, when the distance that the own vehicle has moved since the electronic control unit acquires the construction site sign speed limit currently displayed on the displaying device is equal to or longer than the predetermined displaying change permission distance when the electronic control unit acquires the database limit speed while the electronic control unit displays the construction site sign limit speed on the displaying device, the electronic control unit may be configured to terminate displaying the construction site sign limit speed on the displaying device and display the database limit speed acquired this time on the displaying device.

When the database limit speed is acquired after the own vehicle moves a certain distance since the construction site sign limit speed is acquired, the limit speed to be applied to the own vehicle is probably the database limit speed. Under the circumstances, if the construction site sign limit speed continues being displayed on the displaying device without displaying the database limit speed acquired this time on the displaying device, the limit speed currently displayed on the displaying device may be wrong.

With this aspect of the invention, when the database limit speed is acquired after the own vehicle moves a certain distance, i.e., the predetermined displaying change permission distance since the construction site sign limit speed currently displayed on the displaying device is acquired, the database limit speed acquired this time is displayed on the displaying device. Thus, a suitable limit speed can be displayed on the displaying device as the limit speed to be applied to the own vehicle.

According to another aspect of the invention, when the vehicle forward information includes information on a general road sign which indicates the limit speed for a road other than the construction site, the electronic control unit may be configured to acquire the limit speed indicated on the general road sign as a general sign limit speed, based on the vehicle forward information. In this case, when the electronic control unit acquires the general sign limit speed while the electronic control unit displays the construction site sign limit speed on the displaying device, the electronic control unit may be configured to terminate displaying the construction site sign limit speed on the displaying device and display the general sign limit speed acquired this time on the displaying device even when the distance that the own vehicle has moved since the electronic control unit acquires the construction site sign speed limit currently displayed on the displaying device is shorter than the predetermined displaying change permission distance.

When the general sign limit speed is acquired before the own vehicle has moved a certain distance since the construction site sign limit speed is acquired, the limit speed to be applied to the own vehicle is probably the general sign limit speed. Under the circumstances, the general sign limit speed should be displayed on the displaying device.

With this aspect of the invention, when the general sign limit speed is acquired before the own vehicle moves a certain distance, i.e., the predetermined displaying change permission distance since the construction site sign limit speed currently displayed on the displaying device is acquired, the general sign limit speed acquired this time is displayed on the displaying device. Thus, a suitable limit speed can be displayed on the displaying device as the limit speed to be applied to the own vehicle.

According to further another aspect of the invention, when the vehicle forward information includes information on a general road sign which indicates the limit speed for a road other than the construction site, the electronic control unit may be configured to acquire the limit speed indicated on the general road sign as a general sign limit speed, based on the vehicle forward information. In this case, when (i) the electronic control unit acquires the general sign limit speed while the electronic control unit displays the construction site sign limit speed on the displaying device, and (ii) the distance that the own vehicle has moved since the electronic control unit acquires the construction site sign speed limit currently displayed on the displaying device is equal to or longer than the predetermined displaying change permission distance, the electronic control unit may be configured to terminate displaying the construction site sign limit speed on the displaying device and display the general sign limit speed acquired this time on the displaying device.

When the general sign limit speed is acquired after the own vehicle has moved a certain distance since the construction site sign limit speed is acquired, the limit speed to be applied to the own vehicle is probably the general sign limit speed, not the construction site sign limit speed. Under the circumstances, if the construction site sign limit speed continues being displayed on the displaying device without displaying the general sign limit speed acquired this time on the displaying device, the limit speed currently displayed on the displaying device may be wrong.

With this aspect of the invention, when the general sign limit speed is acquired after the own vehicle has moved a certain distance, i.e., the predetermined displaying change permission distance since the construction site sign limit speed currently displayed on the displaying device is acquired, the general sign limit speed acquired this time is displayed on the displaying device. Thus, a suitable limit speed can be displayed on the displaying device as the limit speed to be applied to the own vehicle.

According to further another aspect of the invention, when the distance that the own vehicle has moved since the electronic control unit acquires the construction site sign speed limit currently displayed on the displaying device reaches a predetermined displaying termination distance longer than the predetermined displaying change permission distance, the electronic control unit may be configured to terminate displaying the construction site sign limit speed on the displaying device.

In general, the construction site has a limited length. Thus, when the own vehicle has moved a relatively long distance since the construction site sign limit speed is acquired, the limit speed to be applied to the own vehicle may not be the construction site sign limit speed. Under the circumstances, if the construction site sign limit speed continues being displayed on the displaying device, the limit speed currently displayed on the displaying device may be wrong.

With this aspect of the invention, displaying the construction site sign limit speed on the displaying device is terminated when the own vehicle has moved a relatively long distance, i.e., the predetermined displaying termination distance since the construction site sign limit speed currently displayed on the displaying device is acquired. Thus, the unsuitable limit speed as the limit speed to be applied to the own vehicle can be prevented from being displayed on the displaying device.

According to further another aspect of the invention, when the electronic control unit acquires the database limit speed while the electronic control unit does not display the construction site sign limit speed on the displaying device, the electronic control unit may be configured to display the database limit speed acquired this time on the displaying device.

When the construction site sign limit speed is not displayed on the displaying device, the own vehicle may not move at the construction site. Under the circumstances, when the database limit speed is acquired, the limit speed to be applied to the own vehicle is probably the acquired database limit speed.

With this aspect of the invention, when the database limit speed is acquired while the construction site sign limit speed is not displayed on the displaying device, the database limit speed acquired this time is displayed on the displaying device. Thus, a suitable limit speed can be displayed on the displaying device as the limit speed to be applied to the own vehicle.

According to further another aspect of the invention, when the vehicle forward information includes information on a general road sign which indicates the limit speed for a road other than the construction site, the electronic control unit may be configured to acquire the limit speed indicated on the general road sign as a general sign limit speed, based on the vehicle forward information. In this case, when the electronic control unit acquires the general sign limit speed while the electronic control unit does not display the construction site sign limit speed on the displaying device, the electronic control unit may be configured to display the general sign limit speed acquired this time on the displaying device.

When the construction site sign limit speed is not displayed on the displaying device, the own vehicle may not move at the construction site. Under the circumstances, when the general sign limit speed is acquired, the limit speed to be applied to the own vehicle is probably the general sign limit speed acquired this time.

With this aspect of the invention, when the general sign limit speed is acquired while the construction site sign limit speed is not displayed on the displaying device, the general sign limit speed acquired this time is displayed on the displaying device. Thus, a suitable limit speed can be displayed on the displaying device as the limit speed to be applied to the own vehicle.

According to further another aspect of the invention, when the vehicle forward information includes information on a general road sign which indicates the limit speed for a road other than the construction site, the electronic control unit may be configured to acquire the limit speed indicated on the general road sign as a general sign limit speed, based on the vehicle forward information. In this case, when the electronic control unit acquires the general sign limit speed while the electronic control unit displays the database limit speed on the displaying device, the electronic control unit may be configured to terminate displaying the database limit speed on the displaying device and display the general sign limit speed acquired this time on the displaying device. In this case, when the electronic control unit acquires the database limit speed while the electronic control unit displays the general sign limit speed on the displaying device, the electronic control unit may be configured to terminate displaying the general sign limit speed on the displaying device and display the database limit speed acquired this time on the displaying device.

With this aspect of the invention, when the general sign limit speed is acquired while the database limit speed is displayed on the displayed device, the limit speed displayed on the displaying device is changed to the general sign limit speed. Further, when the database limit speed is acquired while the general sign limit speed is displayed on the displayed device, the limit speed displayed on the displaying device is changed to the database limit speed. Thus, the latest limit speed can be displayed on the displaying device.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
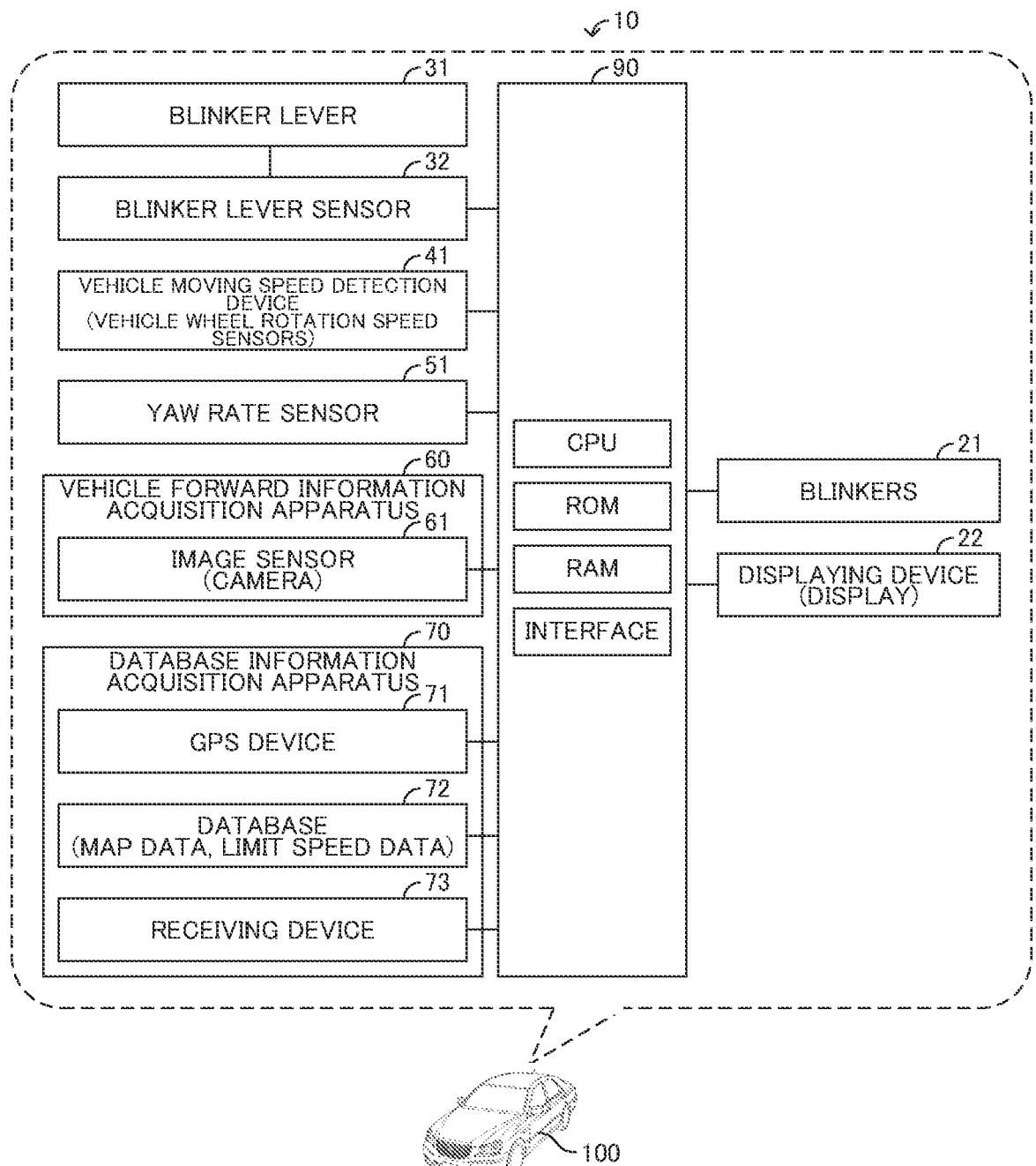
FIG. 1 is a view which shows a vehicle driving assist apparatus according to an embodiment of the invention and a vehicle on which the vehicle driving assist apparatus is installed.

Below, a vehicle driving assist apparatus according to an embodiment of the invention will be described with reference to the drawings. As shown in FIG. 1, the vehicle driving assist apparatus 10 according to the embodiment of the invention is installed on a vehicle, i.e., an own vehicle 100.

The vehicle driving assist apparatus 10 includes an ECU 90 as a control unit. The ECU 90 includes a microcomputer as a main component. The ECU 90 includes a CPU, a ROM, a RAM, a non-volatile memory, and an interface. The CPU is configured or programmed to realize various functions by executing instructions, programs, or routines memorized in the ROM.

<Blinkers>

Further, blinkers 21 are installed on the own vehicle 100. The blinkers 21 are devices which inform people outside the own vehicle 100 of a turning direction in which the own vehicle 100 turns. The blinkers 21 are provided on a right front corner portion, a left front corner portion, a right rear corner portion, and a left rear corner portion of the own vehicle 100, respectively. The blinkers 21 are electrically connected to the ECU 90. The ECU 90 operates the blinkers 21, depending on an operation applied to a blinker lever 31 described later in detail.

<Displaying Device>

Further, a displaying device 22 is installed on the own vehicle 100. The displaying device 22 is a device which displays various images that a driver DR of the own vehicle 100 can see while the driver DR drives the own vehicle 100. For example, the displaying device 22 is a display such as a combination meter or a head-up display (HUD). The displaying device 22 is electrically connected to the ECU 90. The ECU 90 can display various images on the displaying device 22.

<Sensors, Etc.>

Further, a blinker lever 31, a blinker lever sensor 32, a vehicle moving speed detection device 41, a yaw rate sensor 51, a vehicle forward information acquisition apparatus 60, and a database information acquisition apparatus 70 are installed on the own vehicle 100.

<Blinker Lever Sensor>

The blinker lever sensor 32 is a sensor which detects an operation position of the blinker lever 31. The blinker lever 31 is a device which is operated by the driver DR to operate the blinkers 21. The blinker lever sensor 32 is electrically connected to the ECU 90. When the ECU 90 receives a signal which indicates that the blinker lever 31 is operated clockwise from the blinker lever sensor 32, the ECU 90 blinks the blinkers 21 provided on the right front corner portion and the right rear corner portion. On the other hand, when the ECU 90 receives a signal which indicates that the blinker lever 31 is operated counterclockwise from the blinker lever sensor 32, the ECU 90 blinks the blinkers 21 provided on the left front corner portion and the left rear corner portion.

<Vehicle Moving Speed Detection Device>

The vehicle moving speed detection device 41 is a device which detects a moving speed of the own vehicle 100. For example, the vehicle moving speed detection device 41 includes vehicle wheel rotation speed sensors. The vehicle moving speed detection device 41 is electrically connected to the ECU 90. The vehicle moving speed detection device 41 sends information on the detected moving speed of the own vehicle 100 to the ECU 90. The ECU 90 acquires the moving speed of the own vehicle 100, i.e., an own vehicle moving speed V100, based on the information sent from the vehicle moving speed detection device 41.

<Yaw Rate Sensor>

The yaw rate sensor 51 is a sensor which detects a yaw rate YR of the own vehicle 100. The yaw rate sensor 51 is electrically connected to the ECU 90. The yaw rate sensor 51 sends information on the detected yaw rate YR of the own vehicle 100 to the ECU 90. The ECU 90 acquires the yaw rate YR of the own vehicle 100, based on the information sent from the yaw rate sensor 51.

<Vehicle Forward Information Acquisition Apparatus>

The vehicle forward information acquisition apparatus 60 is an apparatus which detects a situation ahead of the own vehicle 100. In this embodiment, the vehicle forward information acquisition apparatus 60 includes an image sensor 61.

<Image Sensor>

The image sensor 61 is a sensor which takes images of a view ahead of the own vehicle 100. For example, the image sensor 61 is a camera. The image sensor 61 is electrically connected to the ECU 90. The image sensor 61 takes an image of the view ahead of the own vehicle 100 and sends information on the taken image to the ECU 90. The ECU 90 can acquire information on the situation ahead of the own vehicle 100, i.e., vehicle forward information IF, based on the information, i.e., image information IC or image data sent from the image sensor 61.

<Database Information Acquisition Apparatus>

The database information acquisition apparatus 70 includes a GPS device 71, a database 72, and a receiving device 73.

<GPS Device>

The GPS device 71 is a device which receives GPS signals. The GPS device 71 is electrically connected to the ECU 90. The GPS device 71 sends the received GPS signals to the ECU 90. The ECU 90 acquires a current position of the own vehicle 100, based on the GPS signals.

<Database>

The database 72 is a device which memorizes various information. In this embodiment, the database 72 memorizes various information such as map information IM and road information IR. It should be noted that the vehicle driving assist apparatus 10 may be configured to acquire the map information IM or the road information IR wirelessly from a database outside of the own vehicle 100.

The database 72 is electrically connected to the ECU 90. The ECU 90 specifies a point on a map where the own vehicle 100 currently moves, based on the current position of the own vehicle 100 and the map information memorized in the database 72, specifies a road on which the own vehicle 100 moves, based on the specified point, and acquires various information on the road where the own vehicle 100 moves as database information ID, based on the road information IR. In this embodiment, the road information IR includes at least information on limit speeds to be applied to vehicles. Thus, the ECU 90 can acquire information on the limit speeds as the database information ID, based on the road information IR.

<Receiving Device>

The receiving device 73 is a device which receives wireless signals indicating information transmitted from a transmitting device such as a road-side device provided on the road. The information indicated by the wireless signals includes at least information on the limit speed to be applied to the vehicle. The receiving device 73 is electrically connected to the ECU 90. The receiving device 73 sends the received wireless signal to the ECU 90. The ECU 90 can acquire the information on the limit speed indicated by the wireless signal as the database information ID.

<Summary of Operations of Vehicle Driving Assist Apparatus>

Next, operations of the vehicle driving assist apparatus 10 will be described.

While the own vehicle 100 moves, the vehicle driving assist apparatus 10 executes a process to acquire a general sign limit speed VG. In particular, when the vehicle forward information IF includes information on a general road sign 200G (i.e., a road sign generally provided on the road), the vehicle driving assist apparatus 10 executes a process to acquire the limit speed indicated on the general road sign 200G as the general sign limit speed VG, based on the information on the general road sign 200G.

In addition, while the own vehicle 100 moves, the vehicle driving assist apparatus 10 executes a process to acquire a database limit speed VD. In particular, when the vehicle driving assist apparatus 10 acquires information on the limit speed to be currently applied to the own vehicle 100, based on the current position of the own vehicle 100 and the map information IM memorized in the database 72, the vehicle driving assist apparatus 10 executes a process to acquire the limit speed indicated by the acquired information as the database limit speed VD.

In addition, while the own vehicle 100 moves, the vehicle driving assist apparatus 10 executes a process to acquire a construction site sign limit speed VC. In particular, when the vehicle forward information IF includes information on a construction site road sign 200C (i.e., the road sign provided at a construction site of the road and indicating the limit speed at the construction site), the vehicle driving assist apparatus 10 executes a process to acquire the limit speed indicated on the construction site road sign 200C as the construction site sign limit speed VC, based on the information on the construction site road sign 200C.

When the vehicle driving assist apparatus 10 acquires the general sign limit speed VG, the database limit speed VD, or the construction site sign limit speed VC, the vehicle driving assist apparatus 10 displays the limit speed on the displaying device 22, depending on a current displaying situation of the displaying device 22 as described below.

When the vehicle driving assist apparatus 10 acquires the general sign limit speed VG while the vehicle driving assist apparatus 10 does not display the construction site sign limit speed VC on the displaying device 22, the vehicle driving assist apparatus 10 displays the general sign limit speed VG acquired this time on the displaying device 22.

Further, when the vehicle driving assist apparatus 10 acquires the general sign limit speed VG while the vehicle driving assist apparatus 10 displays the construction site sign limit speed VC on the displaying device 22, and an own vehicle moving distance Dmove (i.e., a distance that the own vehicle 100 has moved since the vehicle driving assist apparatus 10 acquires the construction site sign limit speed VC currently displayed on the displaying device 22) is equal to or longer than a predetermined distance or a predetermined displaying change permission distance Dth_1, the vehicle driving assist apparatus 10 displays the general sign limit speed VG acquired this time on the displaying device 22 in place of displaying the construction site sign limit speed VC on the displaying device 22.

The vehicle driving assist apparatus 10 acquires the own vehicle moving distance Dmove, based on (i) time elapsing since the vehicle driving assist apparatus 10 acquires the construction site sign limit speed VC currently displayed on the displaying device 22 and (ii) the own vehicle moving speed V100.

The predetermined displaying change permission distance Dth_1 is set to a distance corresponding to a length of the construction site provided with the construction site road sign 200C which indicates the limit speed, or a presumed length of the construction site provided with the construction site road sign 200C which indicates the limit speed. Alternatively, the predetermined displaying change permission distance Dth_1 may be set to a distance corresponding to a general length of the construction site provided with the construction site road sign 200C which indicates the limit speed. Further, the predetermined displaying change permission distance Dth_1 may be set to a distance, depending on countries where the 100 moves.

It should be noted that when the vehicle driving assist apparatus 10 is configured to display the general sign limit speed VG on the displaying device 22 as described above and currently displays the database limit speed VD or the general sign limit speed VG, the vehicle driving assist apparatus 10 displays the general sign limit speed VG acquired this time on the displaying device 22 in place of displaying the database limit speed VD or the general sign limit speed VG on the displaying device 22.

Similarly, when the vehicle driving assist apparatus 10 acquires the database limit speed VD while the vehicle driving assist apparatus 10 does not display the construction site sign limit speed VC on the displaying device 22, the vehicle driving assist apparatus 10 displays the database limit speed VD acquired this time on the displaying device 22.

Further, when the vehicle driving assist apparatus 10 acquires the database limit speed VD while the vehicle driving assist apparatus 10 displays the construction site sign limit speed VC on the displaying device 22, and the own vehicle moving distance Dmove (i.e., the distance that the own vehicle 100 has moved since the vehicle driving assist apparatus 10 acquires the construction site sign limit speed VC currently displayed on the displaying device 22) is equal to or longer than the predetermined distance or the predetermined displaying change permission distance Dth_1, the vehicle driving assist apparatus 10 displays the database limit speed VD acquired this time on the displaying device 22 in place of displaying the construction site sign limit speed VC on the displaying device 22.

It should be noted that when the vehicle driving assist apparatus 10 is configured to display the database limit speed VD on the displaying device 22 as described above and currently displays the general sign limit speed VG or the database limit speed VD, the vehicle driving assist apparatus 10 displays the database limit speed VD acquired this time on the displaying device 22 in place of displaying the general sign limit speed VG or the database limit speed VD on the displaying device 22.

On the other hand, when the vehicle driving assist apparatus 10 acquires the construction site sign limit speed VC while the vehicle driving assist apparatus 10 does not display the limit speed on the displaying device 22, the vehicle driving assist apparatus 10 displays the construction site sign limit speed VC acquired this time on the displaying device 22. Further, when the vehicle driving assist apparatus 10 acquires the construction site sign limit speed VC while the vehicle driving assist apparatus 10 displays the general sign limit speed VG or the database limit speed VD on the displaying device 22, the vehicle driving assist apparatus 10 displays the construction site sign limit speed VC acquired this time on the displaying device 22 in place of displaying the general sign limit speed VG or the database limit speed VD on the displaying device 22.

Further, when the vehicle driving assist apparatus 10 acquires the construction site sign limit speed VC while the vehicle driving assist apparatus 10 displays the construction site sign limit speed VC on the displaying device 22, the vehicle driving assist apparatus 10 displays the construction site sign limit speed VC acquired this time on the displaying device 22.

Further, when the vehicle driving assist apparatus 10 acquires the general sign limit speed VG while the own vehicle moving distance Dmove (i.e., the distance that the own vehicle 100 has moved since the vehicle driving assist apparatus 10 acquires the construction site sign limit speed VC currently displayed on the displaying device 22) is shorter than the predetermined displaying change permission distance Dth_1, the vehicle driving assist apparatus 10 terminates displaying the construction site sign limit speed VC on the displaying device 22 and displays the general sign limit speed VG acquired this time on the displaying device 22.

Further, when the vehicle driving assist apparatus 10 acquires the database limit speed VD while the own vehicle moving distance Dmove (i.e., the distance that the own vehicle 100 has moved since the vehicle driving assist apparatus 10 acquires the construction site sign limit speed VC currently displayed on the displaying device 22) is shorter than the predetermined displaying change permission distance Dth_1, the vehicle driving assist apparatus 10 continues displaying the construction site sign limit speed VC on the displaying device 22 without displaying the database limit speed VD acquired this time on the displaying device 22.

Further, when the vehicle driving assist apparatus 10 acquires the general sign limit speed VG or the database limit speed VD after the own vehicle moving distance Dmove becomes equal to or longer than the predetermined displaying change permission distance Dth_1, the vehicle driving assist apparatus 10 displays the general sign limit speed VG or the database limit speed VD acquired this time on the displaying device 22 in place of displaying the construction site sign limit speed VC on the displaying device 22.

Further, when the vehicle driving assist apparatus 10 has not acquired any of the general sign limit speed VG, the database limit speed VD, and the construction site sign limit speed VC, and the own vehicle moving distance Dmove reaches a predetermined distance or a predetermined displaying termination distance Dth_2 longer than the predetermined displaying change permission distance Dth_1 after the own vehicle moving distance Dmove becomes equal to or longer than the predetermined displaying change permission distance Dth_1, the vehicle driving assist apparatus 10 terminates displaying the construction site sign limit speed VC on the displaying device 22.

Thereby, the vehicle driving assist apparatus 10 displays the limit speed on the displaying device 22 as described below.

Figure 2:
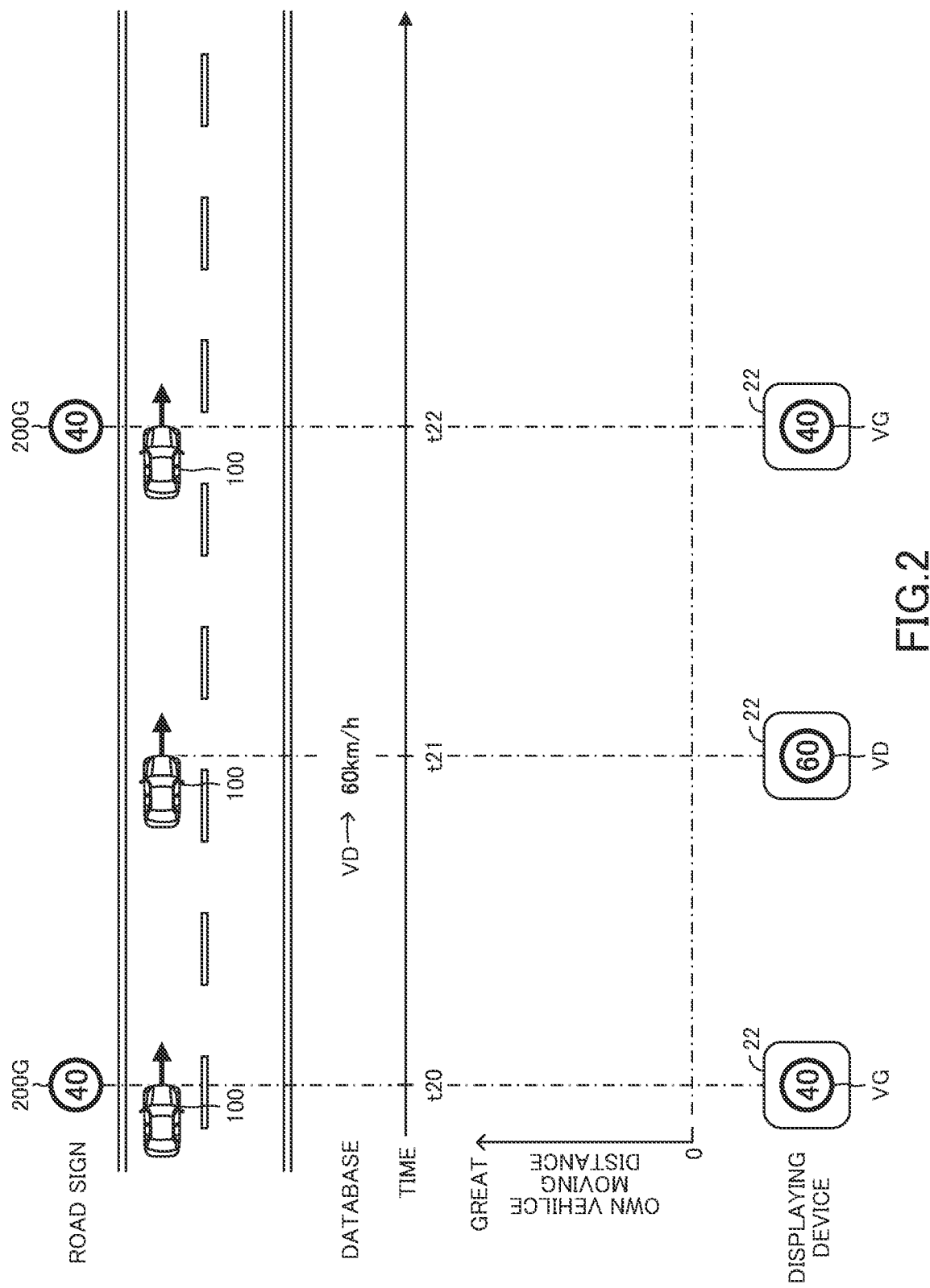
FIG. 2 is a view which shows a displaying pattern of a limit speed realized by the vehicle driving assist apparatus according to the embodiment of the invention.

For example, as shown in FIG. 2, at a time t20 when the vehicle driving assist apparatus 10 acquires the limit speed of 40 km/h indicated on the general road sign 200G as the general sign limit speed VG, based on the vehicle forward information IF, the vehicle driving assist apparatus 10 does not currently display the construction site sign limit speed VC on the displaying device 22 and thus, the vehicle driving assist apparatus 10 displays the general sign limit speed VG of 40 km/h acquired this time on the displaying device 22.

Thereafter, at a time t21 when the vehicle driving assist apparatus 10 acquires the limit speed of 60 km/h as the database limit speed VD, based on the database information ID, the vehicle driving assist apparatus 10 does not display the construction site sign limit speed VC and thus, the vehicle driving assist apparatus 10 displays the database limit speed VD of 60 km/h acquired this time on the displaying device 22 in place of displaying the general sign limit speed VG of 40 km/h on the displaying device 22.

Thereafter, at a time t22 when the vehicle driving assist apparatus 10 acquires the limit speed of 40 km/h indicated on the general road sign 200G as the general sign limit speed VG, based on the vehicle forward information IF, the vehicle driving assist apparatus 10 does not display the construction site sign limit speed VC on the displaying device 22 and thus, displays the general sign limit speed VG of 40 km/h acquired this time on the displaying device 22 in place of displaying the database limit speed VD of 60 km/h on the displaying device 22.

Figure 3:
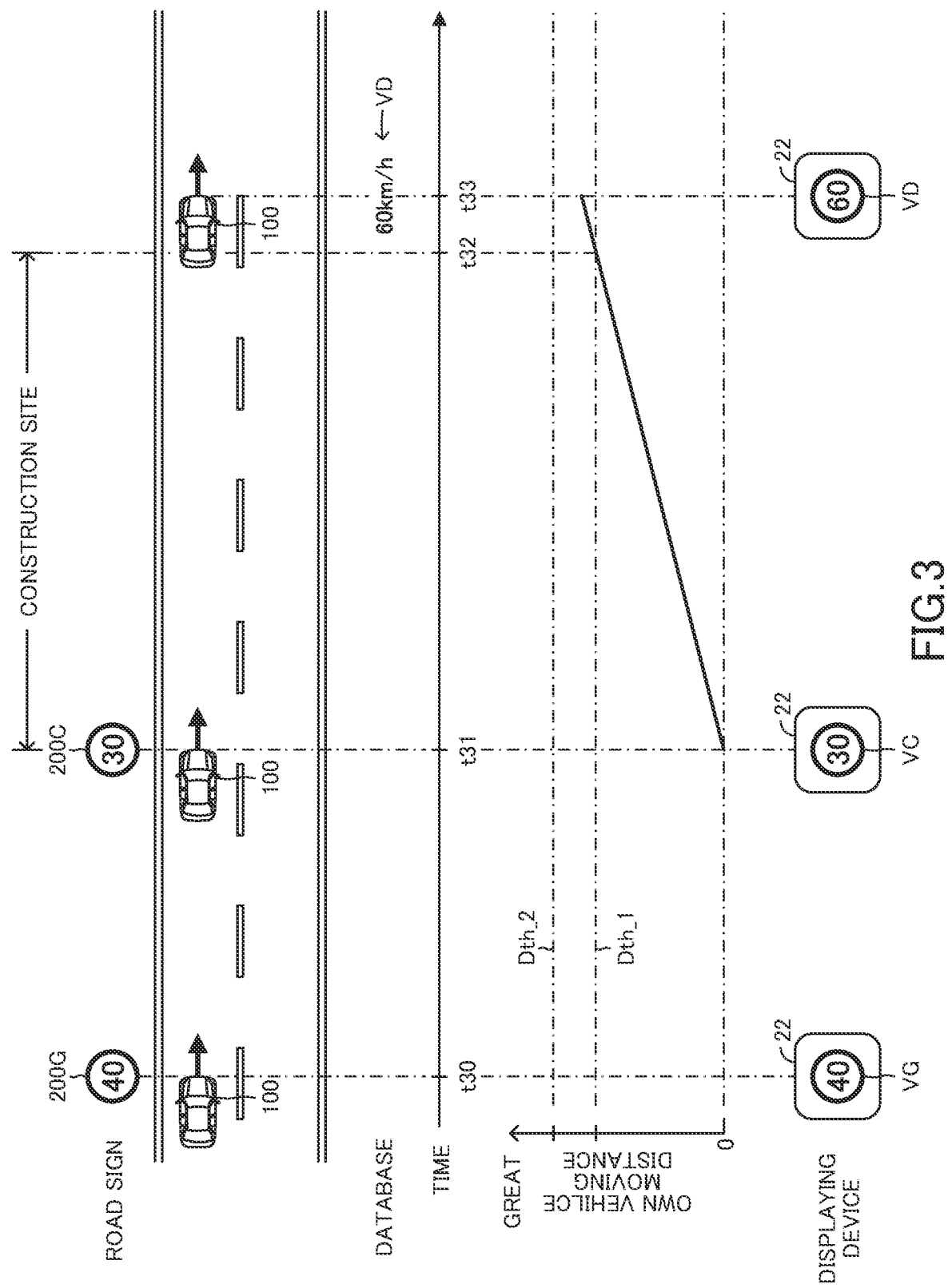
FIG. 3 is a view which shows another displaying pattern of the limit speed realized by the vehicle driving assist apparatus according to the embodiment of the invention.

Further, as shown in FIG. 3, at a time t30 when the vehicle driving assist apparatus 10 acquires the limit speed of 40 km/h indicated on the general road sign 200G as the general sign limit speed VG, based on the vehicle forward information IF, the vehicle driving assist apparatus 10 does not currently display the construction site sign limit speed VC on the displaying device 22 and thus, the vehicle driving assist apparatus 10 displays the general sign limit speed VG of 40 km/h acquired this time on the displaying device 22.

Thereafter, at a time t31 when the vehicle driving assist apparatus 10 acquires the limit speed of 30 km/h as the construction site sign limit speed VC, based on the vehicle forward information IF, the vehicle driving assist apparatus 10 displays the construction site sign limit speed VC of 30 km/h acquired this time on the displaying device 22 in place of displaying the general sign limit speed VG of 40 km/h on the displaying device 22.

Thereafter, at a time t32, the own vehicle moving distance Dmove becomes longer than the predetermined displaying change permission distance Dth_1. Thereafter, at a time t33 when the vehicle driving assist apparatus 10 acquires the limit speed of 60 km/h as the database limit speed VD, based on the database information ID, the vehicle driving assist apparatus 10 currently displays the construction site sign limit speed VC on the displaying device 22, but the own vehicle moving distance Dmove is equal to or longer than the predetermined displaying change permission distance Dth_1. Thus, the vehicle driving assist apparatus 10 displays the database limit speed VD of 60 km/h acquired this time on the displaying device 22 in place of displaying the construction site sign limit speed VC of 30 km/h on the displaying device 22.

Figure 4:
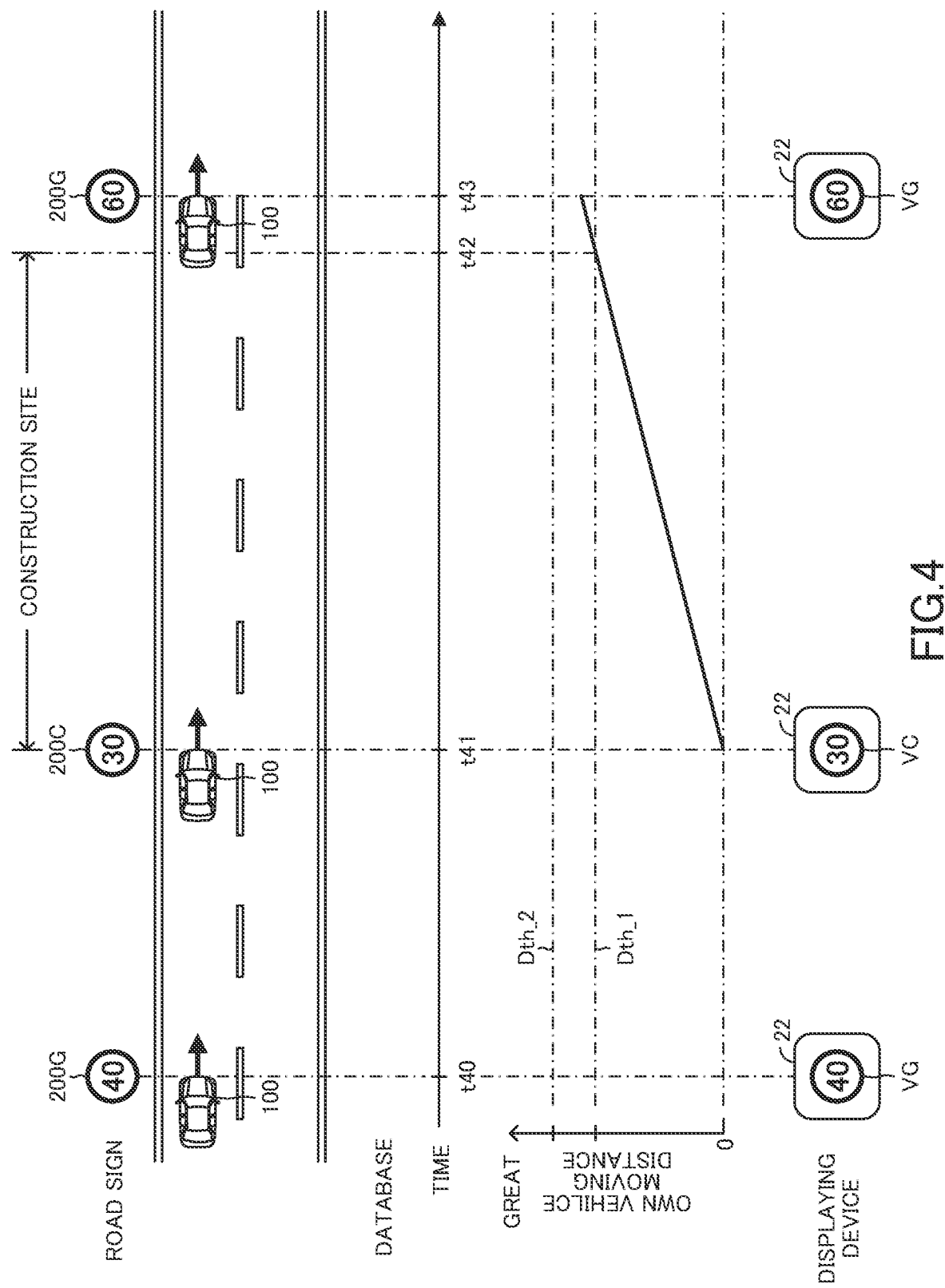
FIG. 4 is a view which shows further another displaying pattern of the limit speed realized by the vehicle driving assist apparatus according to the embodiment of the invention.

Further, as shown in FIG. 4, at a time t40 when the vehicle driving assist apparatus 10 acquires the limit speed of 40 km/h indicated on the general road sign 200G as the general sign limit speed VG, based on the vehicle forward information IF, the vehicle driving assist apparatus 10 does not currently display the construction site sign limit speed VC on the displaying device 22 and thus, the vehicle driving assist apparatus 10 displays the general sign limit speed VG of 40 km/h acquired this time on the displaying device 22.

Thereafter, at a time t41 when the vehicle driving assist apparatus 10 acquires the limit speed of 30 km/h indicated on the construction site road sign 200C as the construction site sign limit speed VC, based on the vehicle forward information IF, the vehicle driving assist apparatus 10 displays the construction site sign limit speed VC of 30 km/h acquired this time on the displaying device 22 in place of displaying the construction site sign limit speed VC of 40 km/h on the displaying device 22.

Thereafter, at a time t42, the own vehicle moving distance Dmove becomes longer than the predetermined displaying change permission distance Dth_1. Thereafter, at a time t43 when the vehicle driving assist apparatus 10 acquires the limit speed of 60 km/h indicated on the general road sign 200G as the general sign limit speed VG, based on the vehicle forward information IF, the vehicle driving assist apparatus 10 currently displays the construction site sign limit speed VC on the displaying device 22, but the own vehicle moving distance Dmove is equal to or longer than the predetermined displaying change permission distance Dth_1. Thus, the vehicle driving assist apparatus 10 displays the general sign limit speed VG of 60 km/h acquired this time on the displaying device 22 in place of displaying the construction site sign limit speed VC of 30 km/h on the displaying device 22.

Figure 5:
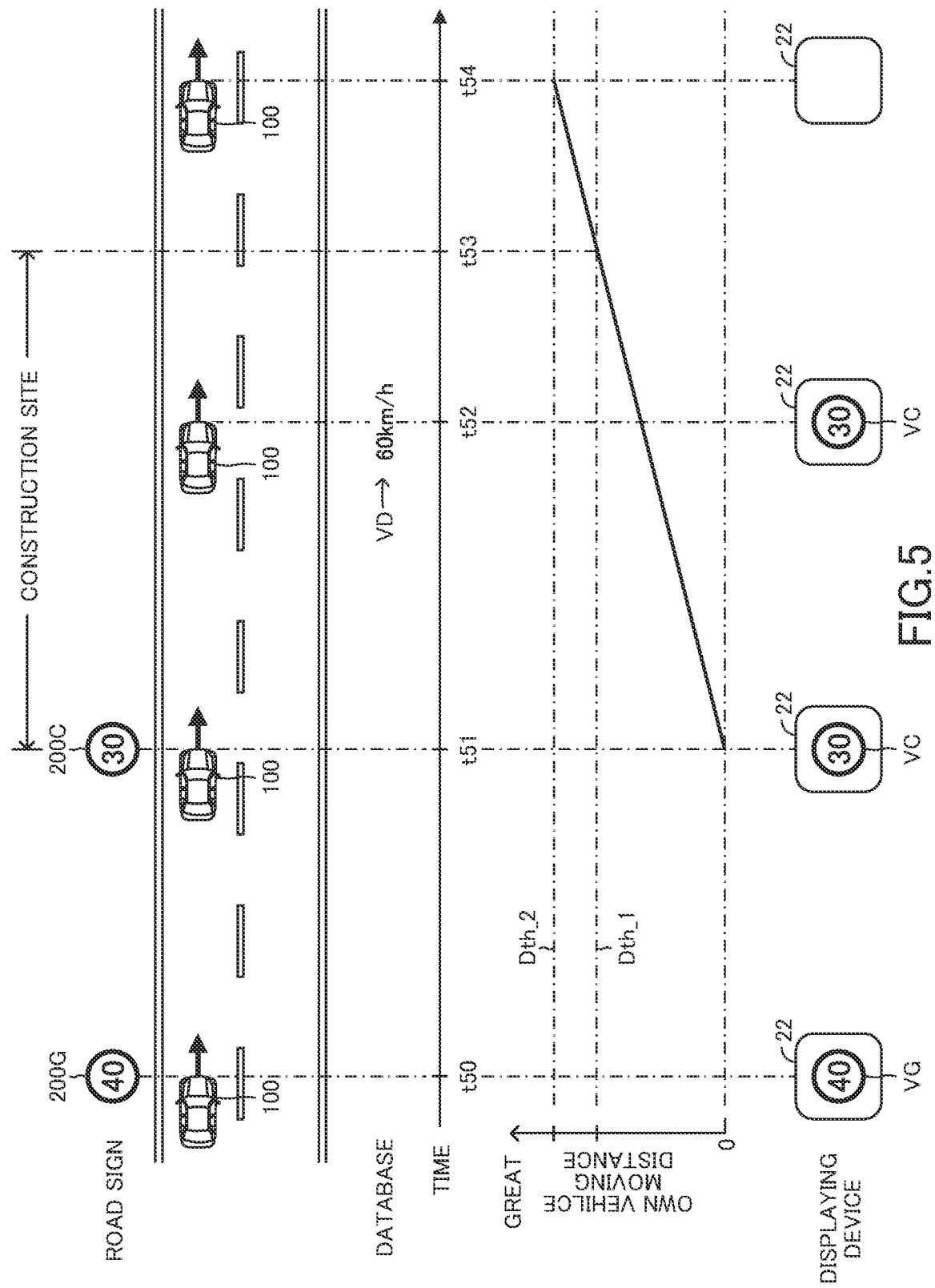
FIG. 5 is a view which shows further another displaying pattern of the limit speed realized by the vehicle driving assist apparatus according to the embodiment of the invention.

Further, as shown in FIG. 5, at a time t50 when the vehicle driving assist apparatus 10 acquires the limit speed of 40 km/h indicated on the general road sign 200G as the general sign limit speed VG, based on the vehicle forward information IF, the vehicle driving assist apparatus 10 does not currently display the construction site sign limit speed VC on the displaying device 22 and thus, the vehicle driving assist apparatus 10 displays the general sign limit speed VG of 40 km/h acquired this time on the displaying device 22.

Thereafter, at a time t51 when the vehicle driving assist apparatus 10 acquires the limit speed of 30 km/h indicated on the construction site road sign 200C as the construction site sign limit speed VC, based on the vehicle forward information IF, the vehicle driving assist apparatus 10 displays the construction site sign limit speed VC of 30 km/h acquired this time on the displaying device 22 in place of displaying the general sign limit speed VG of 40 km/h on the displaying device 22.

Thereafter, at a time t52 when the vehicle driving assist apparatus 10 acquires the limit speed of 60 km/h as the database limit speed VD, based on the database information ID, the vehicle driving assist apparatus 10 currently displays the construction site sign limit speed VC on the displaying device 22, and the own vehicle moving distance Dmove is shorter than the predetermined displaying change permission distance Dth_1. Thus, the vehicle driving assist apparatus 10 continues displaying the construction site sign limit speed VC of 30 km/h on the displaying device 22 without displaying the database limit speed VD of 60 km/h acquired this time on the displaying device 22.

It should be noted that in an example shown in FIG. 5, at a time t53, the own vehicle moving distance Dmove becomes longer than the predetermined displaying change permission distance Dth_1 and then, at a time t54, the own vehicle moving distance Dmove reaches the predetermined displaying termination distance Dth_2, but the general sign limit speed VG, the database limit speed VD, and the construction site sign limit speed VC are not acquired. Thus, at the time t54, the vehicle driving assist apparatus 10 terminates displaying the limit speed (in the example shown in FIG. 5, the construction site sign limit speed VC of 30 km/h) on the displaying device 22.

Figure 6:
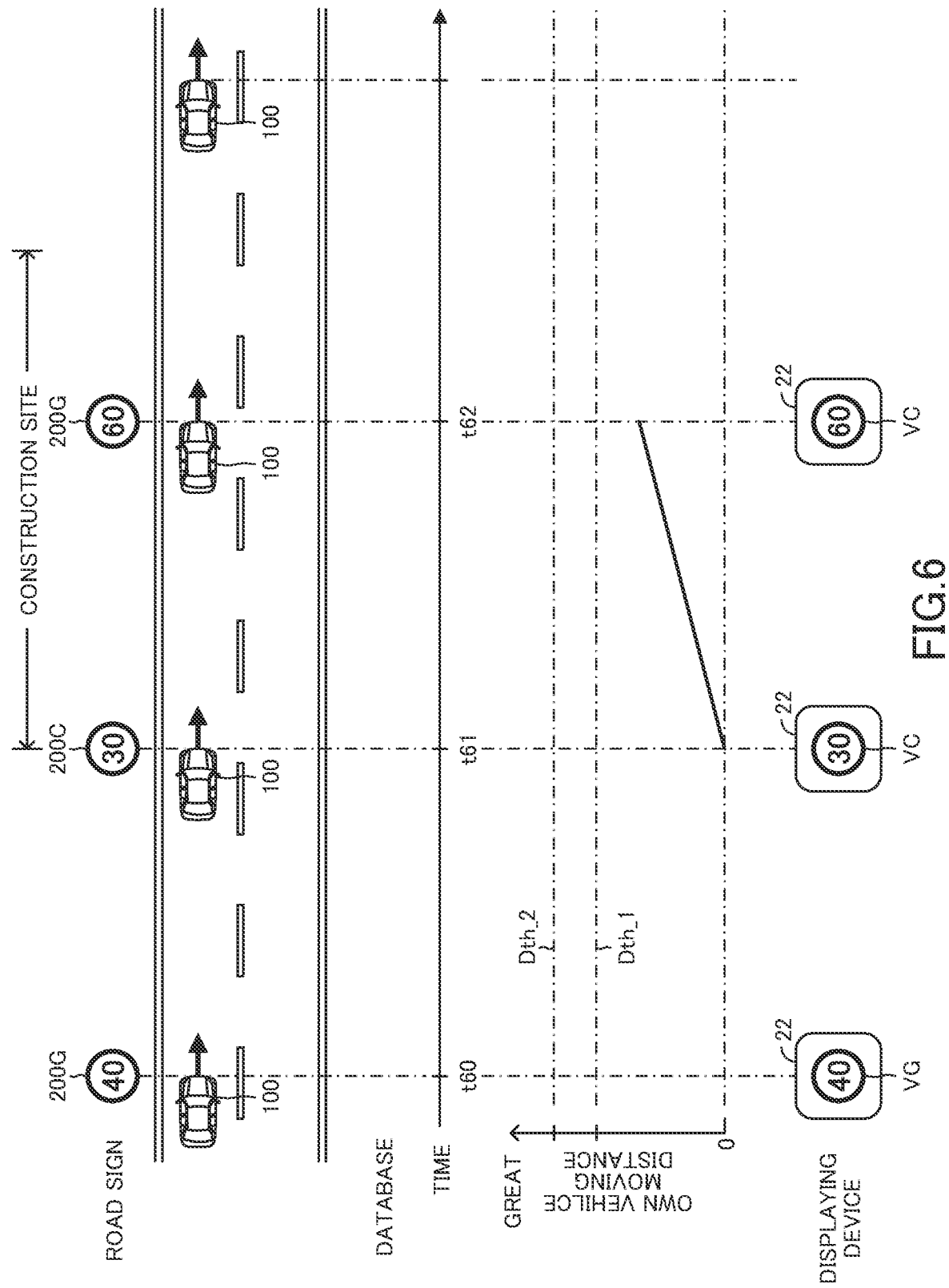
FIG. 6 is a view which shows further another displaying pattern of the limit speed realized by the vehicle driving assist apparatus according to the embodiment of the invention.

Further, as shown in FIG. 6, at a time t60 when the vehicle driving assist apparatus 10 acquires the limit speed of 40 km/h indicated on the general road sign 200G as the general sign limit speed VG, based on the vehicle forward information IF, the vehicle driving assist apparatus 10 does not currently display the construction site sign limit speed VC on the displaying device 22 and thus, the vehicle driving assist apparatus 10 displays the general sign limit speed VG of 40 km/h acquired this time on the displaying device 22.

Thereafter, at a time t61 when the vehicle driving assist apparatus 10 acquires the limit speed of 30 km/h indicated on the construction site road sign 200C as the construction site sign limit speed VC, based on the vehicle forward information IF, the vehicle driving assist apparatus 10 displays the construction site sign limit speed VC of 30 km/h acquired this time on the displaying device 22 in place of displaying the general sign limit speed VG of 40 km/h on the displaying device 22.

Thereafter, at a time t62 when the vehicle driving assist apparatus 10 acquires the limit speed of 60 km/h as the general sign limit speed VG, based on the vehicle forward information IF, the vehicle driving assist apparatus 10 currently displays the construction site sign limit speed VC on the displaying device 22, and the own vehicle moving distance Dmove is shorter than the predetermined displaying change permission distance Dth_1. Thus, the vehicle driving assist apparatus 10 terminates displaying the construction site sign limit speed VC of 30 km/h on the displaying device 22 and displays the general sign limit speed VG of 60 km/h acquired this time on the displaying device 22.

It should be noted that the own vehicle 100 may turn right or left while the construction site sign limit speed VC is displayed on the displaying device 22. When the own vehicle 100 turns right or left while the construction site sign limit speed VC is displayed on the displaying device 22, the vehicle driving assist apparatus 10 terminates displaying the construction site sign limit speed VC on the displaying device 22. The vehicle driving assist apparatus 10 determines whether the own vehicle 100 turns right or left, based on an operation state of the blinkers 21 and the yaw rate YR of the own vehicle 100. The vehicle driving assist apparatus 10 determines that the own vehicle 100 turns right or left when the blinkers 21 are blinked, and the yaw rate YR becomes equal to or greater than a right-left turning determination value YRth.

Further, the construction site road sign 200C may be provided immediately after the general road sign 200G. In this case, if acquiring the limit speed indicated on the general road sign 200G as the general sign limit speed VG, based on the vehicle forward information IF and displaying the general sign limit speed VG acquired this time on the displaying device 22, or if acquiring the limit speed indicated on the construction site road sign 200C as the construction site sign limit speed VC, based on the vehicle forward information IF and displaying the construction site sign limit speed VC acquired this time on the displaying device 22, the limit speed displayed on the displaying device 22 changes shortly. Thus, the driver DR may not recognize the limit speed displayed on the displaying device 22.

Accordingly, when the vehicle driving assist apparatus 10 acquires the general sign limit speed VG or the construction site sign limit speed VC, based on the vehicle forward information IF, the vehicle driving assist apparatus 10 may start to display the general sign limit speed VG or the construction site sign limit speed VC acquired this time on the displaying device 22 at a point of time when a distance that the own vehicle 100 has moved since the vehicle driving assist apparatus 10 acquires the general sign limit speed VG or the construction site sign limit speed VC this time reaches a certain distance. In this case, the certain distance is set to a distance sufficient to avoid changing the limit speeds displayed on the displaying device 22 to make it hard for the driver DR to recognize. Thus, the certain distance is set to a distance considerably shorter than the predetermined displaying change permission distance Dth_1.

<Advantages>

Even when the database limit speed VD is acquired before the own vehicle 100 moves a certain distance since the construction site sign limit speed VC is acquired, the limit speed to be applied to the own vehicle 100 is probably the construction site sign limit speed VC. Under the circumstances, if the database limit speed VD is displayed on the displaying device 22 at a point of time when the database limit speed VD is acquired, the wrong limit speed may be displayed on the displaying device 22.

With the vehicle driving assist apparatus 10, when the database limit speed VD is acquired before the own vehicle 100 moves a certain distance, i.e., the predetermined displaying change permission distance Dth_1 since the construction site sign limit speed VC is acquired, the construction site sign limit speed VC continues being displayed on the displaying device 22. Thus, a suitable limit speed can be displayed on the displaying device 22 as the limit speed to be applied to the own vehicle 100.

On the other hand, when the general sign limit speed VG is acquired before the own vehicle 100 moves a certain distance since the construction site sign limit speed VC is acquired, the limit speed to be applied to the own vehicle 100 is probably the general sign limit speed VG. Under the circumstance, if the construction site sign limit speed VC is displayed on the displaying device 22, the wrong limit speed may be displayed on the displaying device 22.

With the vehicle driving assist apparatus 10, when the general sign limit speed VG is acquired before the own vehicle 100 moves a certain distance, i.e., the predetermined displaying change permission distance Dth_1 since the construction site sign limit speed VC is acquired, displaying the construction site sign limit speed VC on the displaying device 22 is terminated, and the general sign limit speed VG is displayed on the displaying device 22. Thus, a suitable limit speed can be displayed on the displaying device 22 as the limit speed to be applied to the own vehicle 100.

<Specific Operations of Vehicle Driving Assist Apparatus>

Next, specific operations of the vehicle driving assist apparatus 10 will be described. The CPU of the ECU 90 of the vehicle driving assist apparatus 10 is configured or programmed to execute a routine shown in FIG. 7 with a predetermined calculation cycle. Thus, at a predetermined time, the CPU starts a process from a step 700 of the routine shown in FIG. 7 and proceeds with the process to a step 705 to determine whether the construction site sign limit speed VC is acquired.

When the CPU determines "Yes" at the step 705, the CPU proceeds with the process to a step 710 to display the construction site sign limit speed VC acquired this time on the displaying device 22. Next, the CPU proceeds with the process to a step 795 to terminate executing this routine once.

On the other hand, when the CPU determines "No" at the step 705, the CPU proceeds with the process to a step 715 to determine whether the general sign limit speed VG is acquired.

When the CPU determines "Yes" at the step 715, the CPU proceeds with the process to a step 720 to display the general sign limit speed VG acquired this time on the displaying device 22. Next, the CPU proceeds with the process to the step 795 to terminate executing this routine once.

On the other hand, when the CPU determines "No" at the step 715, the CPU proceeds with the process to a step 725 to determine whether the database limit speed VD is acquired.

Figure 8:
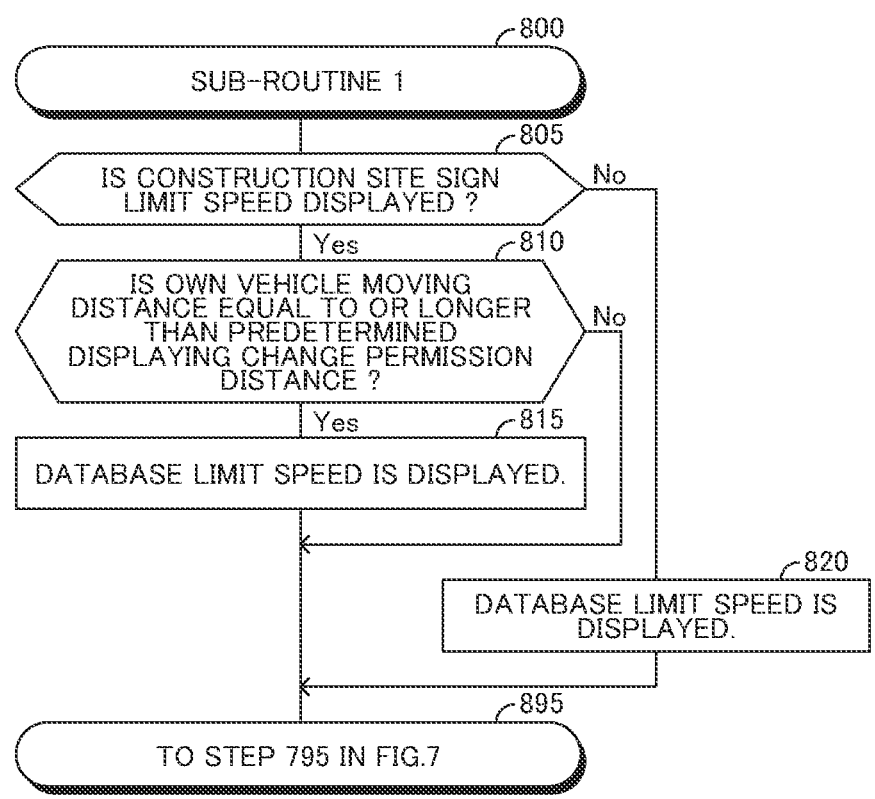
FIG. 8 is a view which shows a flowchart of a routine executed by the vehicle driving assist apparatus according to the embodiment of the invention.

When the CPU determines "Yes" at the step 725, the CPU proceeds with the process to a step 730 to execute a routine shown in FIG. 8. Thus, when the CPU proceeds with the process to the step 730, the CPU starts a process from a step 800 of the routine shown in FIG. 8 and proceeds with the process to a step 805 to determine whether the construction site sign limit speed VC is displayed.

When the CPU determines "Yes" at the step 805, the CPU proceeds with the process to a step 810 to determine whether the own vehicle moving distance Dmove is equal to or longer than the predetermined displaying change permission distance Dth_1.

When the CPU determines "Yes" at the step 810, the CPU proceeds with the process to a step 815 to display the database limit speed VD acquired this time on the displaying device 22. Next, the CPU proceeds with the process to the step 795 of the routine shown in FIG. 7 via a step 895 to terminate executing this routine once.

Figure 7:
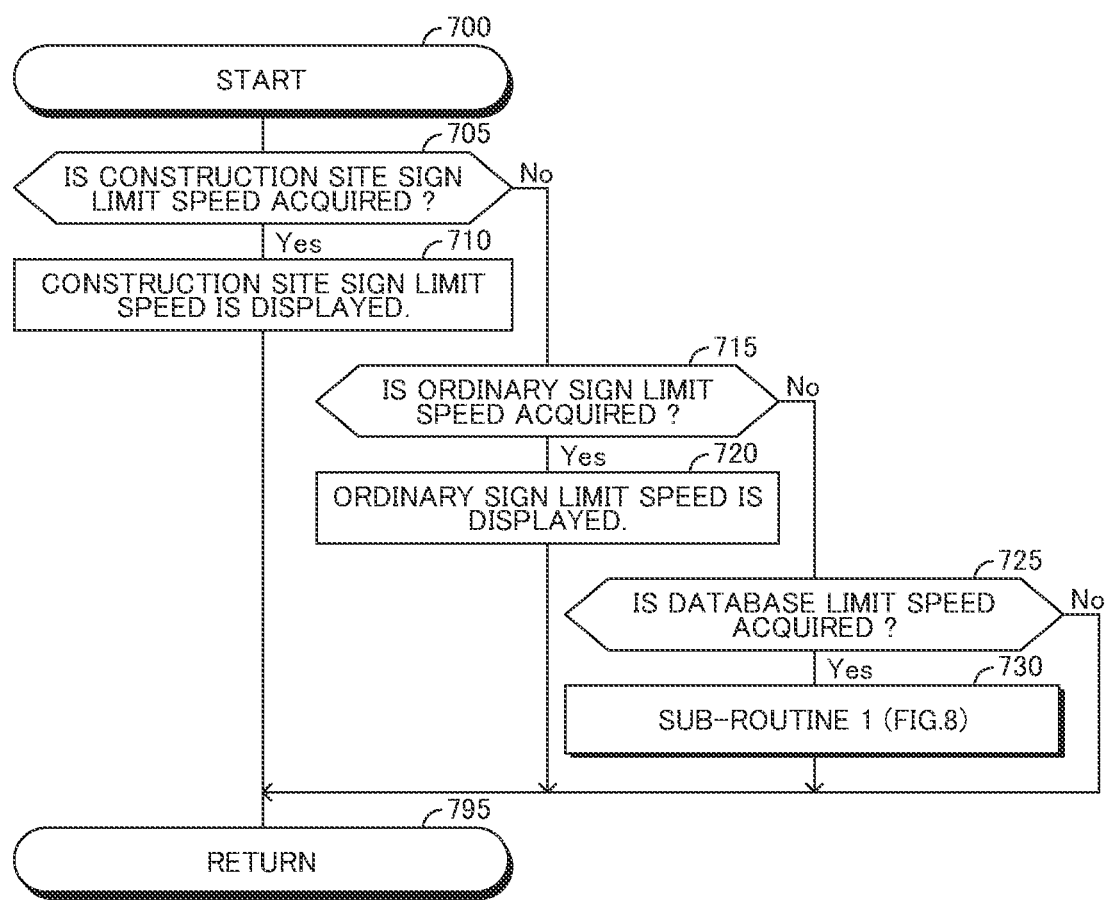
FIG. 7 is a view which shows a flowchart of a routine executed by the vehicle driving assist apparatus according to the embodiment of the invention.

On the other hand, when the CPU determines "No" at the step 810, the CPU proceeds with the process directly to the step 795 of the routine shown in FIG. 7 via the step 895 to terminate executing this routine once. In this case, the construction site sign limit speed VC continues being displayed on the displaying device 22.

Further, when the CPU determines "No" at the step 805, the CPU proceeds with the process to a step 820 to display the database limit speed VD acquired this time on the displaying device 22. Next, the CPU proceeds with the process to the step 709 of the routine shown in FIG. 7 via the step 895 to terminate executing this routine once.

Further, when the CPU determines "No" at the step 730 of the routine shown in FIG. 7, the CPU proceeds with the process directly to the step 795 to terminate executing this routine once.

Figure 9:
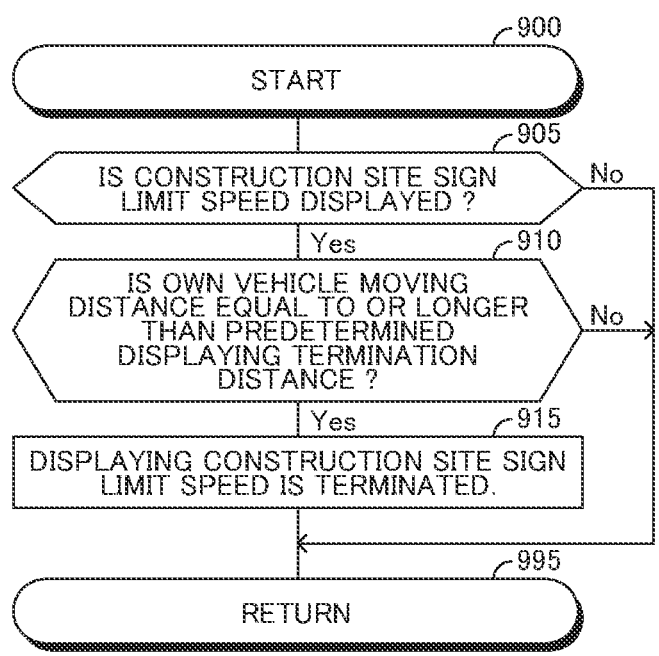
FIG. 9 is a view which shows a flowchart of a routine executed by the vehicle driving assist apparatus according to the embodiment of the invention.

Further, the CPU is configured or programmed to execute a routine shown in FIG. 9 with the predetermined calculation cycle. Thus, at a predetermined time, the CPU starts a process from a step 900 of the routine shown in FIG. 9 and proceeds with the process to a step 905 to determine whether the construction site sign limit speed VC is displayed.

When the CPU determines "Yes" at the step 905, the CPU proceeds with the process to a step 910 to determine whether the own vehicle moving distance Dmove is equal to or longer than the predetermined displaying termination distance Dth_2.

When the CPU determines "Yes" at the step 910, the CPU proceeds with the process to a step 915 to terminate displaying the construction site sign limit speed VC on the displaying device 22. Next, the CPU proceeds with the process to a step 995 to terminate executing this routine once.

On the other hand, when the CPU determines "No" at the step 910, the CPU proceeds with the process directly to the step 995 to terminate executing this routine once.

Further, when the CPU determines "No" at the step 905, the CPU proceeds with the process directly to the step 995 to terminate executing this routine once.

Figure 10:
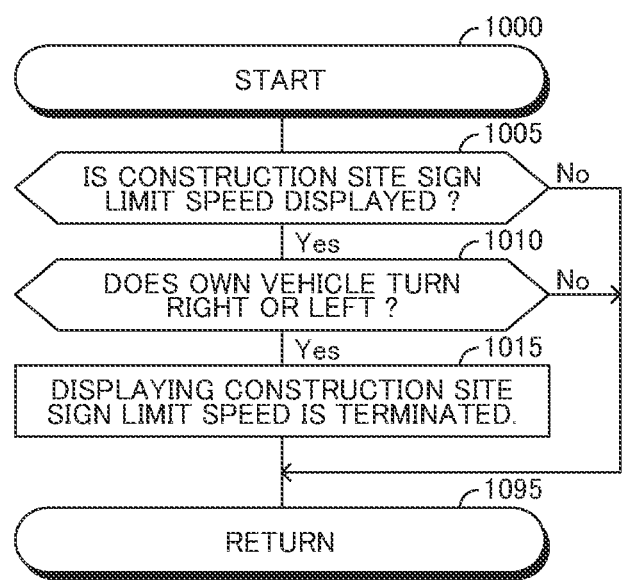
FIG. 10 is a view which shows a flowchart of a routine executed by the vehicle driving assist apparatus according to the embodiment of the invention.

Furthermore, the CPU is configured or programmed to execute a routine shown in FIG. 10 with the predetermined calculation cycle. Thus, at a predetermined time, the CPU starts a process from a step 1000 of the routine shown in FIG. 10 and proceeds with the process to a step 1005 to determine whether the construction site sign limit speed VC is displayed.

When the CPU determines "Yes" at the step 1005, the CPU proceeds with the process to a step 1010 to determine whether the own vehicle 100 turns right or left.

When the CPU determines "Yes" at the step 1010, the CPU proceeds with the process to a step 1015 to terminate displaying the construction site sign limit speed VC on the displaying device 22. Next, the CPU proceeds with the process to a step 1095 to terminate executing this routine once.

On the other hand, when the CPU determines "No" at the step 1010, the CPU proceeds with the process directly to the step 1095 to terminate executing this routine once.

Further, when the CPU determines "No" at the step 1005, the CPU proceeds with the process directly to the step 1095 to terminate executing this routine once.

The specific operations of the vehicle driving assist apparatus 10 have been described.

It should be noted that the invention is not limited to the aforementioned embodiments, and various modifications can be employed within the scope of the invention.

What is claimed is:

1. A vehicle driving assist apparatus, comprising:
   a vehicle forward information acquiring apparatus which takes images of a view ahead of an own vehicle and acquires information on a situation ahead of the own vehicle as vehicle forward information, based on information of the taken images; and
   an electronic control unit which controls displaying a limit speed to be applied to the own vehicle on a displaying device of the own vehicle,
   wherein the electronic control unit is configured to:
      acquire the limit speed indicated on a road sign as a road sign limit speed, based on the vehicle forward information and acquire the limit speed to be currently applied to the own vehicle as a database limit speed from a database which memorizes the limit speeds;
      when the vehicle forward information includes information on a construction site road sign which indicates the limit speed at a construction site, acquire the limit speed indicated on the construction site road sign as a construction site sign limit speed, based on the vehicle forward information and display the construction site sign limit speed currently acquired on the displaying device; and
      when (i) the electronic control unit acquires the database limit speed while the electronic control unit displays the construction site sign limit speed on the displaying device, and (ii) a distance that the own vehicle has moved since the electronic control unit acquires the construction site sign speed limit currently displayed on the displaying device is shorter than a predetermined displaying change permission distance, continue displaying the construction site sign limit speed on the displaying device without displaying the database limit speed currently acquired on the displaying device.

2. The vehicle driving assist apparatus as set forth in claim 1, wherein when the distance that the own vehicle has moved since the electronic control unit acquires the construction site sign speed limit currently displayed on the displaying device is equal to or longer than the predetermined displaying change permission distance when the electronic control unit acquires the database limit speed while the electronic control unit displays the construction site sign limit speed on the displaying device, the electronic control unit is configured to terminate displaying the construction site sign limit speed on the displaying device and display the database limit speed currently acquired on the displaying device.

3. The vehicle driving assist apparatus as set forth in claim 1, wherein the electronic contra! unit is configured to:
when the vehicle forward information includes information on a general road sign which indicates the limit speed for a road other than the construction site, acquire the limit speed indicated on the general road sign as a general sign limit speed, based on the vehicle forward information; and
when the electronic control unit acquires the genera! sign limit speed while the electronic contra! unit displays the construction site sign limit speed on the displaying device, terminate displaying the construction site sign limit speed on the displaying device and display the general sign limit speed currently acquired on the displaying device even when the distance that the own vehicle has moved since the electronic contra! unit acquires the construction site sign speed limit currently displayed on the displaying device is shorter than the predetermined displaying change permission distance.

4. The vehicle driving assist apparatus as set forth in claim 1, wherein the electronic control unit is configured to:
when the vehicle forward information includes information on a general road sign which indicates the limit speed for a road other than the construction site, acquire the limit speed indicated on the general road sign as a general sign limit speed, based on the vehicle forward information; and
when(i) the electronic control unit acquires the general sign limit speed while the electronic control unit displays the construction site sign limit speed on the displaying device, and (ii) the distance that the own vehicle has moved since the electronic control unit acquires the construction site sign speed limit currently displayed on the displaying device is equal to or longer than the predetermined displaying change permission distance, terminate displaying the construction site sign limit speed on the displaying device and display the general sign limit speed currently acquired on the displaying device.

5. The vehicle driving assist apparatus as set forth in claim 1, wherein when the distance that the own vehicle has moved since the electronic control unit acquires the construction site sign speed limit currently displayed on the displaying device reaches a predetermined displaying termination distance longer than the predetermined displaying change permission distance, the electronic control unit is configured to terminate displaying the construction site sign limit speed on the displaying device.

6. The vehicle driving assist apparatus as set forth in claim 1, wherein when the electronic control unit acquires the database limit speed while the electronic control unit does not display the construction site sign limit speed on the displaying device, the electronic control unit is configured to display the database limit speed currently acquired on the displaying device.

7. The vehicle driving assist apparatus as set forth in claim 1, wherein the electronic control unit is configured to:
when the vehicle forward information includes information on a general road sign which indicates the limit speed for a road other than the construction site, acquire the limit speed indicated on the general road sign as a general sign limit speed, based on the vehicle forward information; and
when the electronic control unit acquires the general sign limit speed while the electronic control unit does not display the construction site sign limit speed on the displaying device, display the general sign limit speed currently acquired on the displaying device.

8. The vehicle driving assist apparatus as set forth in claim 1, wherein the electronic control unit is configured to:
when the vehicle forward information includes information on a general road sign which indicates the limit speed for a road other than the construction site, acquire the limit speed indicated on the general road sign as a general sign limit speed, based on the vehicle forward information;
when the electronic control unit acquires the general sign limit speed while the electronic control unit displays the database limit speed on the displaying device, terminate displaying the database limit speed on the displaying device and display the general sign limit speed currently acquired on the displaying device; and
when the electronic control unit acquires the database limit speed while the electronic control unit displays the general sign limit speed on the displaying device, terminate displaying the general sign limit speed on the displaying device and display the database limit speed currently acquired on the displaying device.

* * * * *